L. PALMER.
HOSE CLAMP.
APPLICATION FILED FEB. 28, 1922

1,419,897. Patented June 13, 1922.

Lafayette Palmer
INVENTOR

BY Victor J. Evans
ATTORNEY

WITNESS:

UNITED STATES PATENT OFFICE.

LAFAYETTE PALMER, OF HARRISBURG, PENNSYLVANIA.

HOSE CLAMP.

1,419,897. Specification of Letters Patent. Patented June 13, 1922.

Application filed February 28, 1922. Serial No. 540,028.

*To all whom it may concern:*

Be it known that I, LAFAYETTE PALMER, a citizen of the United States, residing at Harrisburg, in the county of Dauphin and State of Pennsylvania, have invented new and useful Improvements in Hose Clamps, of which the following is a specification.

This invention relates to clamping devices, particularly to clamps designed for use in connection with hose of all kinds, and has for its object the provision of a novel clamp formed of quickly and easily detachable sections which are so constructed, arranged and interengaged as to facilitate their ready engagement upon a hose whether the hose be of a type used in gardens and the like or whether it be of the type used in connection with the water system of automobiles.

An important object is the provision of a clamp in which the ends of the sections are formed with interengaging flanges which operate as hooks for holding the sections together, the sections being provided at their other ends with apertured tongues for the passage of a clamping screw carrying a tongue.

An additional object is the provision of a clamp of this character which is so constructed that there is little likelihood of any breakage of the parts during use or after long extended use, auxiliary tongues being also provided at certain points which will operate to insure even and uniform pressure upon the hose so as to prevent any possible leakage therein at the joints.

An additional object is the provision of a device of this character which will be very simple and inexpensive to manufacture, highly efficient in use, durable in service and a general improvement in the art.

With the above and other objects and advantages in view, the invention consists in the details of construction to be hereinafter more fully described and claimed, and illustrated in the accompanying drawings, in which:

Figure 1:
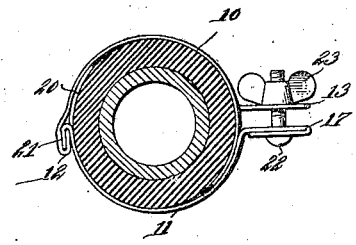
Figure 1 is a cross sectional view through a hose equipped with my clamp.
Figure 2:
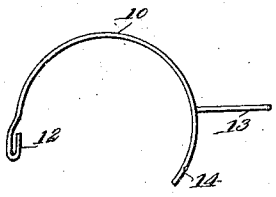
Figure 2 is a perspective view of one of the sections.
Figure 3:
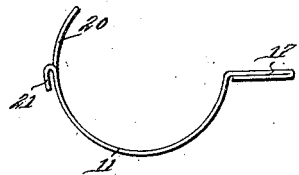
Figure 3 is a perspective view of the other section.
Figure 4:
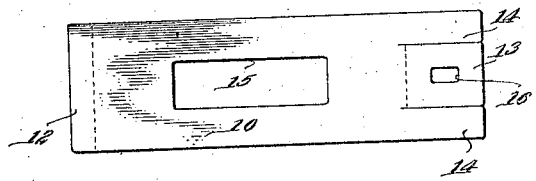
Figures 4 and 5 are views of the blanks from which the sections are formed
Figure 5:
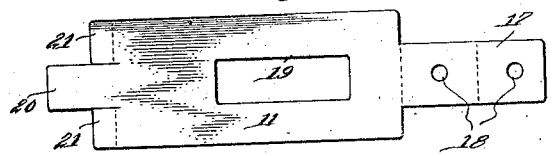

Referring more particularly to the drawings, I have shown my clamp as comprising two sections 10 and 11 which are formed of resilient metal and which may be of any size depending upon the size of the hose with which they are to be used. The sections 10 are of the same width and are of the same general construction so they naturally must differ in certain details as will be explained.

The section 10 has one end bent upon itself as indicated at 12 to define a hook-like flange and has its other end slit along spaced lines to define a central tongue 13 which is bent upwardly with respect to the body of the section and also to define spaced outer tongues 14. The intermediate portion of this section is formed with a longitudinal slot or cutaway portion 15. The central tongue 13 is formed with a somewhat elongated hole 16 for a purpose to be described.

The section 11 has one end cut away to define an elongated tongue 17 which is preferably bent over upon itself as shown for the purpose of providing reinforcement and which is formed with a hole 18 designed to register with the elongated hole 16 of the section 10. The intermediate portion of the section 11 is formed with a cutout portion or slot 19 while the other end thereof is partially cut away at its corner and slit and then subsequently bent to provide a central tongue 20 and outer tongues which are bent over upon themselves to define hook-like flanges 21 similar in shape to the flanges 12 of the section 10.

The use of the device is as follows:

The sections 10 and 11 are associated with each other by engaging the hook flanges 21 of the section 11 with the hook flange or bent end 12 of the section 10, these flanges forming an interlock which constitutes the pivotal connection of the sections. When the sections are thus engaged it will be apparent that the central tongue 20 on the section 11 will slightly overlap the adjacent end of the slot 15 in the section 10 while the tongues 14 on the section will be disposed against the inner side of the section 11 at opposite sides of the slot 19 therein. These relatively small tongues exert a pressure upon the hose so as to make the pressure uniform throughout and insure the proper clamping action while preventing any leakage at the joints. After the sections are assembled as above described it is of course apparent that they are held together by means of a suitable screw 22 which is passed through the holes 16 and 18 and which carries a clamping nut 23. This screw and nut may be of the thumb type or weight type as this detail has no material bearing on the invention.

From the foregoing description and a study of the drawings it will be apparent that I have thus provided a very simple construction and consequently inexpensive hose clamp which will be of material advantage in use as it may be quickly and easily applied and may be removed and re-applied any number of times without any danger of the parts wearing out owing to the fact that there is no bending of any of the tongues involved in placing the device in position or removing it. It is also apparent that the construction is such as to insure proper clamping action on the hose and that the device should be highly efficient in every way. It is also apparent that the construction is such that the device may be readily used in connection with the hose connection of automobiles as well as in connection with garden hose and the like, in the latter use it being apparent that the specific form of the device will be of material advantage as there is very little to catch into the grass and cause annoyance to the user.

While I have shown and described the preferred embodiment of the invention, it is to be understood that I reserve the right to make such changes in the form, construction and arrangement of parts as will not depart from the spirit of the invention or the scope of the subjoined claim.

Having thus described the invention, what is claimed is:

A clamping device of the character described comprising a pair of sections of substantially semi-circular formation, one section being formed at one end with an inwardly bent flange and having its other end split to define a pair of outer tongues and an inner tongue bent outwardly with respect to the sections, said inner tongue being formed with an elongated hole, the other section having one end formed with an elongated relatively narrow central tongue and being formed outwardly of said narrow tongue with hook-like flanges cooperating with said first named flange for constituting a connection between the sections, and the other end of said second named section being formed with an elongated reduced tongue bent upon itself to provide reinforcement and formed with a hole, said spaced tongues on the first named section engaging against the inner periphery of the second named section and the central tongue on the second named section engaging against the inner periphery of the first named section, and a clamping bolt passing through the free ends of both of said sections.

In testimony whereof I affix my signature.

LAFAYETTE PALMER.